United States Patent
Stuhlmann et al.

(10) Patent No.: US 9,493,257 B2
(45) Date of Patent: Nov. 15, 2016

(54) DEVICE AND METHOD FOR FORMING PACKING UNITS

(75) Inventors: Christopher Stuhlmann, Korbach (DE); Ernst Van Wickeren, Weeze (DE);

(Continued)

(73) Assignee: KHS GmbH, Dortmund (DE)

( * ) Notice: Subject to any disclaimer, the term of this patent is extended or adjusted under 35 U.S.C. 154(b) by 257 days.

(21) Appl. No.: 14/361,889

(22) PCT Filed: Sep. 12, 2012

(86) PCT No.: PCT/EP2012/003816
§ 371 (c)(1),
(2), (4) Date: May 30, 2014

(87) PCT Pub. No.: WO2013/079128
PCT Pub. Date: Jun. 6, 2013

(65) Prior Publication Data
US 2015/0122397 A1    May 7, 2015

(30) Foreign Application Priority Data

Dec. 2, 2011 (DE) .......................... 10 2011 119 964

(51) Int. Cl.
*B65B 17/02* (2006.01)
*B65B 21/00* (2006.01)
(Continued)

(52) U.S. Cl.
CPC ............... *B65B 17/02* (2013.01); *B65B 21/00* (2013.01); *B65B 35/10* (2013.01); *B65B 35/16* (2013.01);
(Continued)

(58) Field of Classification Search
CPC ................... B65B 17/02; B65B 17/025; B65B 27/04; B65B 21/06; B65B 13/20;
(Continued)

(56) References Cited

U.S. PATENT DOCUMENTS

| | | | |
|---|---|---|---|
| 6,837,360 B2 * | 1/2005 | Schoeneck | B65G 47/841<br>198/418.7 |
| 7,726,464 B2 | 6/2010 | Cerf | |
| 2011/0089055 A1 * | 4/2011 | Perl | B65D 71/0085<br>206/139 |

FOREIGN PATENT DOCUMENTS

| | | |
|---|---|---|
| DE | 1294872 | 5/1969 |
| DE | 2331193 | 1/1975 |

(Continued)

*Primary Examiner* — Carson Gross
(74) *Attorney, Agent, or Firm* — Occhiuti & Rohlicek LLP (57) ABSTRACT

A container-packer includes a compartment and/or compressor unit, applicators, a linear transporter for transporting along a direction, and displaceable head guides. The unit compartmentalizes and compresses containers into packs. The applicators apply adhesive to a container contact surface. The linear transporter comprises three sections. A first section has first through third part regions. In the first, transport surfaces are parallel. In the second, the transport surfaces are brought together to form respective part-packs. In the third, the part packs are transverse to the direction and transported in a direction of the second section of the linear transporter in whose first and second sections the applicators are provided. The displaceable head guides are for single-container transport in the first section. The second section comprises a turning-and-feeding section for the part-packs. The third section brings part packs together oriented in the direction to produce a complete pack.

9 Claims, 2 Drawing Sheets

(75) Inventors: Volker Zahn, Volkmarsen (DE);
Thomas Nitsch, Kleve (DE); Stefan Wagner, Xanten (DE)

(51) Int. Cl.
*B65B 35/16* (2006.01)
*B65B 35/24* (2006.01)
*B65B 35/44* (2006.01)
*B65B 35/56* (2006.01)
*B65G 47/08* (2006.01)
*B65G 47/68* (2006.01)
*B65B 35/10* (2006.01)
*B65B 27/04* (2006.01)

(52) U.S. Cl.
CPC ............... *B65B 35/24* (2013.01); *B65B 35/44* (2013.01); *B65B 35/56* (2013.01); *B65G 47/088* (2013.01); *B65G 47/681* (2013.01); *B65B 27/04* (2013.01); *Y10T 156/10* (2015.01); *Y10T 156/1744* (2015.01); *Y10T 156/1751* (2015.01)

(58) Field of Classification Search
CPC ..................... B65B 35/10; B65B 35/16; B65B 35/24; B65B 35/26; B65B 35/30; B65B 35/36; B65B 35/44; B65B 35/46; B65B 35/56; Y10T 156/1744; Y10T 156/1751; B65G 47/681; B65G 47/08; B65G 47/088
See application file for complete search history.

(56) References Cited

FOREIGN PATENT DOCUMENTS

| | | | | |
|---|---|---|---|---|
| DE | 2331193 A1 | * | 1/1975 | ......... B65D 21/0205 |
| DE | 4126212 | | 2/1993 | |
| DE | 102006037105 | | 2/2008 | |
| DE | 102009025824 | * | 11/2010 | ............ B65B 17/02 |
| DE | 102009044271 | | 4/2011 | |
| DE | 102011119966 | | 11/2012 | |
| DE | 102012005925 | | 11/2012 | |
| EP | 2096039 | | 9/2009 | |
| WO | WO2009/059876 | | 5/2009 | |

* cited by examiner

DEVICE AND METHOD FOR FORMING PACKING UNITS

RELATED APPLICATIONS

This application is the national stage entry under 35 USC 371 of PCT application PCT/EP2012/003816, filed on Sep. 12, 2012, which claims the benefit of the Dec. 2, 2011 priority date of German application DE 10 2011 119 964.4, the contents of which are herein incorporated by reference.

FIELD OF INVENTION

The invention relates to container processing, and in particular, to producing packs of containers.

BACKGROUND

It is often desirable to group containers into container packs that are sold as a unit.

One known way to form container packs is by wrapping them in shrink films, as described in U.S. Pat. No. 7,726,464. One of the disadvantages of shrink films is that the films used, and in particular the shrinking-on of the films by the application of heat or energy, causes considerable expense.

Another known way to form container packs is to strap containers together, as described in DE 10 2009 025 824, DE 10 2009 044 271, and DE 41 26 212. This is a particularly inexpensive and simple way of producing packs or transport and storage units.

One disadvantage of strapping, however, is that when one container is removed from such a pack, the pack as a whole tends to fall apart. The strapping can no longer adequately hold the remaining containers into a pack. This is the case not only when the strapping is removed or cut but also when one removes a container from the pack without severing the strapping.

Moreover transporting such packs on a belt conveyor often presents the danger of having cylindrical or chiefly cylindrical articles, such as cans, bottles or containers, assume a nesting position, i.e. having them slip into a gap in an adjacent row, due to vibration, impacts etc. With known packs, a very high tension must be applied to the strapping in order to avoid this.

SUMMARY

An object of the invention is to provide a device and a method for producing packs of the type mentioned at the beginning, whereby despite the lack of an enveloping film and/or despite the lack of strapping, the articles are always prevented, in a simple manner, from adopting a nesting position while being transported, and even after one or more articles are removed from a pack the cohesion of the remaining articles in the pack is maintained or can be restored.

The invention features a device and a method for producing packs, wherein, by means of a division into lines, containers are converted from a wide container stream into a plurality of single-track container streams in which the containers exhibit an arbitrary orientation relative to their container features and/or furnishing features. Compressed or formed container groups or part-packs are formed with at least one compartment and/or compressor unit for compartmentalizing and compressing a predetermined number of containers, which are then combined into a later pack. Applicator elements are provided such that a bonding or adhesive agent and/or a bonding or adhesive agent application is applied to at least one contact surface or interface on at least one of the containers of the pack.

A device for producing packs as set forth herein achieves this object. In the case of such a device, a linear transporter is provided that transports the containers from an inlet side towards an outlet side, with the linear transporter having three sections. The first section of the linear transporter has three part-regions, with transport surfaces being parallel with one another in the first part-region, with the transport surfaces in the second part-region being merged to form the respective part-pack, and with the respective part-pack being transported in the third part-region oriented square to the transport direction towards the second section of the linear transporter. Provided in a first and in a second section of the linear transporter are applicator elements for applying bonding or adhesive agent. Transversely displaceable head guides are provided in the first section of the linear transporter, with the second section being executed as a turning-and-feeding section for part-packs, and, in a third section, with the part-packs oriented in the transport direction being brought together to produce the complete pack, which is then transported towards the discharge side.

According to the method, containers are converted from a wide container stream into a plurality of single-track container streams and, by separating and bringing together a predetermined number of containers, part-packs are formed and subsequently combined to form the complete pack. At least one of the containers of the pack has a bonding or adhesive agent application on at least one contact surface or interface.

To this end, the method comprises at least the following steps, namely the providing of at least one of the containers of the respective part-pack with bonding or adhesive agent in a first section of the linear transporter, the bringing together of the containers into the respective part-pack in that the head guides concerned are transversely displaced, the transporting of the respective part-pack with the application of force by way of the head guides aligned square to the transport direction, the aligning of the respective part-pack linearly to the transport direction, the providing of at least one of the containers of the respective part-pack with bonding or adhesive agent in a second section of the linear transporter, the bringing together of the respective part-packs in a third section of the linear transporter to the pack and the onward transport of the pack in the third section under the application of force.

"Containers" in the sense of the invention are for example bottles, cans, tubes, pouches, being made from metal, glass and/or plastic, thus for example also PET bottles but also other packaging elements, in particular those which are suitable for the filling of liquid or viscous products, but also containers already combined into groups, bundles, or packaging units and arranged in non-nesting positions.

"Adhesive agents" in the sense of the invention include all materials or masses that facilitate an adhesive bond between containers, in particular compounds, materials or masses that, when applied in the liquid or semi-liquid state, form a self-adhesive coat and/or bring about an adhesive bond under the application of pressure and/or energy and/or after curing or cross-linking, including through application of energy.

"Bonding agents or adhesives" in the sense of the invention also include multilayer materials, e.g. those comprising at least one carrier material that is coated with a material with which an adhesive bond between containers is possible, and that are therefore bondingly and/or adhesively active on at least two sides. Such bonding or adhesive agents can also be referred to as pads.

An "adhesive" container has, in the sense of the invention, bonding agent or adhesive, or is provided with an application of bonding agent and adhesive. The bonding or adhesive agent is preferably selected such that the containers can be detached from the pack and separated from one another by hand and without damage.

It is conceivable for liquid adhesive agent to be applied by the application elements. It is possible to apply a low-viscosity UV-curing adhesive. A hot-melt adhesive would also be suitable. However, a hot-melt adhesive cools very rapidly however and so could possibly lose its adhesive properties before the containers of the pack have had a chance to be sufficiently bonded to one another.

A UV-curing adhesive is also beneficial due to the particularly easy setting of its desired properties. A corresponding curing station or curing section is usefully provided downstream of the application elements statically or along the linear transporter above and if necessary also below. A curing station can be a tunnel with UV-lighting for example.

It is expedient if, in its first section, the linear transporter has a plurality of transport surfaces that accompany the containers from the inlet side towards the outlet side and towards the second section of the linear transporter. It is advantageous if the number of transport surfaces matches the number of single-track container streams. Six transport surfaces may be provided for example.

The first section of the linear transporter has three part-regions, of which one first part-region extends from the inlet side towards the second part-region, which adjoins the third part-region, which in turn extends as far as the second section of the linear transporter.

In the first part-region, the exemplary six transport surfaces are parallel with one another.

In the second part-region the single-track container streams are merged to form the respective part-pack.

In the third part-region the respective part-pack is transported toward the second section.

By way of example, two part-packs each exhibiting three containers can be formed. To this extent it is beneficial in the sense of the invention if the six single-track container streams previously mentioned by way of example are merged in such a way that, for example, three single-track container streams produce the part-pack.

It is also expedient if the central transport surfaces of each of the two sets of three transport surfaces in the second part-region are parallel with one another and also parallel with a center-line of the linear transporter, with the transport surfaces that are respectively outer and inner relative to the respectively central transport surface being guided respectively from the outside in towards the center-line of the linear transporter and from the inside oriented away from the center-line of the linear transporter towards the respectively central transport surface.

Two part-packs each exhibiting three containers are formed in this way. When seen in plan view, one can also refer to a conical embodiment of the second part-region with its three container tracks and that tapers from the transition of the first part-region towards the third part-region.

It is also expedient if applicator elements are disposed in the second part-region of the first section of the linear transporter and provide only the containers of the central container track with bonding or adhesive agent. It is sufficient for the purpose of the invention to provide only one container of the part-pack, preferably the middle container, with the bonding and/or adhesive agent on its contact surfaces and interfaces.

In the third part-region, the three containers are conveyed side-by-side, i.e. the part-pack aligned square to the transport direction when seen in plan view, towards the second section. If UV-curing adhesive is applied, a curing station or curing section can be provided in the first section, preferably in its third part-region.

It is an advantage if the head guides are disposed at the first section of the linear transporter. The head guides can be configured in the manner of a tulip of the type known from labeling machines for example. The number of head guides matches the number of single-track container streams, such that for example six head guides can be provided.

The head guides are mounted on cross-rails, the corresponding number of head guides being arranged on each cross-rail.

A plurality of cross-rails is provided. The cross-rails extend continuously and are attached to a drive element, e.g. to a chain or belt.

The head guides engage over the container head from above to stabilize the container's position as it is conveyed in the transport direction. The head guides lift up off the containers at the end of the first section. As already mentioned, the head guides are transversely displaceable. This is advisable in order to be able to continue stabilize the position of a container as it travels downstream. The head guides in other words facilitate maintaining a stable position of the three container streams to form the part-pack concerned, including along the transport surfaces that run obliquely towards the respectively central transport surface.

The head guides however also have the function of exerting sufficient force on the bundled containers. This is conducive to forming an adhesive bond. It is beneficial for the purpose of the invention if the head guides can be displaced relative to the cross-rails. To achieve this displacement, it is useful for the head guides to have a corresponding drive. The respectively outer and inner head guides with containers thereon are fed towards one another, with the part-packs or their containers being pressed against one another under the action of force along their transport path. The drive of the head guides along the transport direction and also for setting down and lifting up can be executed as a sliding block guide, with the head guide engaging in the corresponding guide by a control element. A further possibility is a motorized drive, preferably by electric motor.

Entraining elements, which are configured to be circulating and which, in interaction with the head guides, can support the transport along the transport surface, can beneficially be provided in the first section.

In the second section which is contiguous with the first section of the linear transporter, the part-packs are rotated out of their alignment oriented square to the transport direction, preferably through 90°, so as to be aligned parallel with the transport direction by no later than the third section. This rotation can be effected by a turning device or by suitably configured transport surfaces. For example, the initial plurality of transport surfaces in the second section could each exhibit different speeds relative to one another such that one end of the respective part-pack is aligned oriented in the transport direction. This aligning effect can be assisted if the second section is preferably continually reduced in its transport width such that, in an end region of the second section, the transport width is dimensioned somewhat larger than the diameter of the container, with only one transport lane being provided for the respective part-pack in the end region.

The second section is implemented in its end region with just one transport lane each, which in a preferred embodiment guides the two part-packs towards one another obliquely to the transport direction. The transport lanes can be driven and can be configured to circulate. Further applicator elements, which now provide the contact surfaces and interfaces of the containers disposed in the respective part-pack with bonding or adhesive agent, are provided in the end region. A further beneficial measure is for the transport width of the respective transport lanes to be somewhat greater than the diameter of the containers as otherwise the "sticky side" that carries the bonding or adhesive agent could rub along containing walls or guide elements and impair the bonding or adhesive agent application.

At the exit from the second section and entry to the third section the two part-packs are combined to form the complete pack, with the contact surfaces and interfaces provided with bonding or adhesive agent lying against one another.

The third section has two transport lanes, i.e. one transport lane for each original part-pack. Guide elements are arranged laterally on the transport lanes. At right angles to the transport direction the guide elements are spaced such that the complete pack and/or the containers therein are pressed against one another, with the action of force here again promoting the production of the adhesive bond. The guide elements can be implemented as guide rails that guide or support the packs or the containers of the pack between them.

In some embodiments, the guide elements are rigidly executed. It is however also possible for the guide elements to be configured as elements travelling with the transport lanes such that the containers or packs do not move relative to the laterally disposed guide elements.

The laterally disposed guide elements can generate a lateral pressure to promote adhesive bonding of the containers of the pack The guide elements therefore not only have the function of guiding and supporting but also the function of generating a pressure acting on the containers that, when looked at square to the transport direction, compresses the containers of the pack and draws them nearer to one another, pressing them against one another so as to promote an adequate adhesive bond.

If UV-curing adhesive is applied, a curing station or curing section can be arranged in the third section. Driver elements, such as those in the first section, could be provided at the third section to assist the transport of the complete packs towards the discharge side.

The pack, i.e. the complete pack, which is made up of the partial packs, can be executed in a plurality of rows when seen in transport direction, i.e. for example in two or three rows.

It is possible also to provide the pack, i.e. the complete pack, with a carrying element, such as a handle. To carry this out, suitable devices may be arranged downstream of the discharge side or at a suitable position on the linear transporter. The carrying element can be attached to the pack with the afore-mentioned adhesive agent.

The object of the process-related part of the task is resolved by a method as described herein, exhibiting at least the steps that at least one of the containers of a part-pack is provided by way of applicator elements with a bonding or adhesive agent on at least its contact surfaces and interfaces, the containers of the part-pack are brought together by way of the head guides and are transported onward under the action of force, with the respective part-pack aligned square to the transport direction, and with the respective part-packs being rotated in a second section of the linear transporter, preferably through 90°, such that the part-packs at the exit from the second section and at the entry to a contiguous third section of the linear transporter are aligned parallel to the transport direction, with further applicator elements providing at least one of the containers of the respective part-pack, preferably each container of the respective part-pack, with bonding or adhesive agent on at least its contact surfaces and interfaces, with the part-packs being in the third section combined to form the complete pack, bonded to one another and transported onward under transverse action of force.

The invention therefore provides a device and a method for producing a pack and which despite the lack of an enveloping film and/or despite the lack of strapping prevents in a simple manner the containers from adopting a nesting position while being transported. Even after one or more containers are removed from a pack the cohesion of the remaining containers in the pack is maintained and/or can be restored.

Dispensing with a film or strapping band (filmless bottle pack) eases the burden on the environment by avoiding waste, so also saving resources used to produce the films or strappings, which are usually produced from plastic.

The containers of a pack are stuck directly to one another during transport, i.e. in the continuous operation of the device for producing packs.

It is also beneficial that the individual containers do not have to be rotated, e.g. to be able to adequately apply the adhesive. A filmless bottle pack can also be achieved with a minimum adhesive application that exhibits an adequate bond of the individual containers to one another. The applicator elements can also be rigidly arranged on the device, or be entrained along a partial section.

In one aspect, the invention features apparatus for producing container packs from single-track container streams. Such an apparatus comprises a compartment and/or compressor unit, applicator elements, a linear transporter for transporting along a transport direction, and displaceable head guides, wherein the compartment and/or compressor unit compartmentalizes and compresses a predetermined number of containers that are to be combined into packs, wherein the applicator elements are configured to apply a substance to a location on a container, wherein the substance is selected from the group consisting of a bonding agent and an adhesive agent, wherein the location is selected from the group consisting of a contact surface and an interface on a container of the pack, wherein the linear transporter comprises a first section, a second section, and a third section, wherein the first section of the linear transporter comprises a first part region, a second part region, and a third part region, wherein, in the first part region of the first section of the linear transporter, transport surfaces are parallel to one another, wherein in the second part region of the first section of the linear transporter, the transport surfaces are brought together to form respective part-packs, wherein in the third part region of the first section of the linear transporter, the part packs are oriented transversely to the transport direction and transported in a direction of the second section of the linear transporter in whose first and second section the applicator elements for applying bonding or adhesive agent are provided, wherein the displaceable head guides are provided for single-container transport in the first section of the linear transporter wherein the second section of the linear transporter comprises a turning-and-feeding section for the part-packs, and wherein, in the third section of the linear transporter, the part packs are brought together oriented in the transport direction to produce a complete pack, and transported towards a discharge side.

In some embodiments, the applicator elements are arranged in a second part-region of the first section of the linear transporter, and wherein the applicator elements are arranged in an end region of the second section of the linear transporter.

Other embodiments further comprise cross-rails, wherein the cross-rails are attached to a drive element, wherein the cross rails circulate, and wherein the head guides are mounted on the cross-rails.

In yet other embodiments, the head guides press containers of a respective part-pack against one another in the third part region of the first section of the linear transporter, and wherein the contact surfaces or interfaces are provided with substance selected from the group consisting of a bonding agent and an adhesive agent upstream in the second part-region of the first section of the linear transporter.

Among the embodiments are those in which the part-packs are aligned parallel with the transport direction in the second section of the linear transporter.

In some embodiments, a transport width of transport lanes of the second section of the linear transporter is reduced starting from the first section of the linear transporter going towards the third section of the linear transporter, with a clear minimum transport width thereof being greater than a diameter of the containers.

In other embodiments, the applicator elements are disposed in an end region of the second section of the linear transporter.

In yet other embodiments, the third section of the linear transporter comprises two transport surfaces.

Further embodiments include those in which the third section of the linear transporter comprises laterally disposed guide elements, wherein the laterally disposed guide elements apply a force square to the transport direction to the pack brought together from the part-packs.

In another aspect, the invention features a method for producing a pack. Such a method includes converting a wide container stream into a plurality of single-track container streams by compartmentalizing and compressing a predetermined number of containers, forming part-packs, and combining part-packs to form a pack, with at least one of the containers of the pack having a substance applied to a location, wherein the location is selected from the group consisting of an interface and a contact surface, and wherein the substance is selected from the group consisting of a bonding agent and an adhesive agent, wherein combining part-packs comprises in a first section of a linear transporter having a transport direction, providing at least one container of a part-pack with the substance, bringing together containers to form a respective part-pack by transversely displacing head guides, transporting the respective part-pack under action of a force by way of the head guides, the head guides being aligned square to the transport direction, aligning the respective part-pack linearly relative to the transport direction, in a second section of the linear transporter, providing at least one of the containers of the respective part-pack with the substance, bringing together the respective part-packs in a third section of the linear transporter to form the pack, and transporting the pack onward in the third section of the linear transporter under effect of the force.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained in detail below through the use of an embodiment example with reference to the figures. In the figures.

In the different figures, the same reference character in each case identifies identical parts, which is why they are generally described only once. Articles are referred to as containers hereinafter.

DETAILED DESCRIPTION

Figure 1:
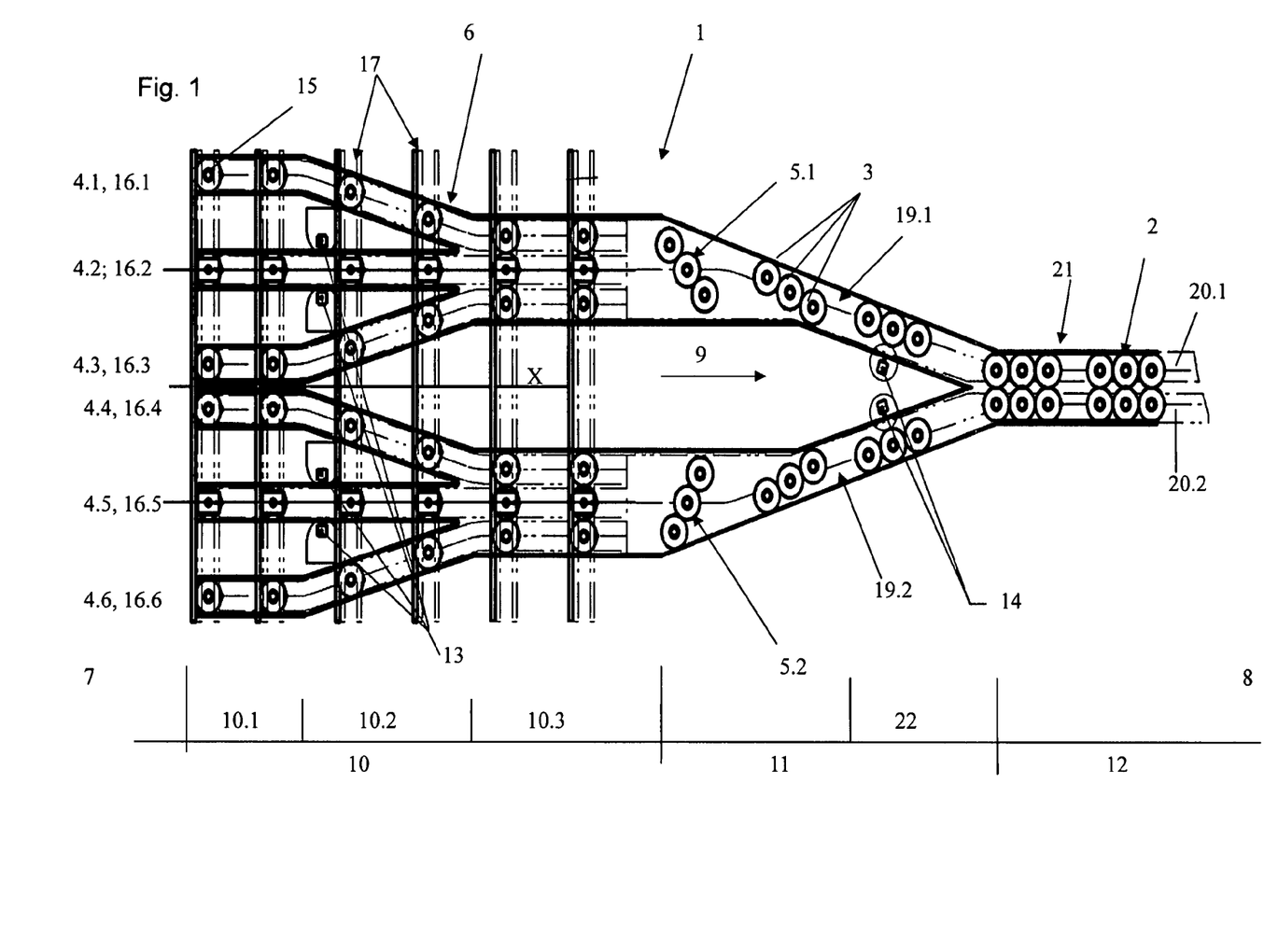
FIG. 1 shows, in plan view, a partial section of a device for producing a pack having six articles or containers.

FIG. 1 shows a partial section of a packaging machine 1 for producing packs 2 from containers 3. The containers 3 travel in a wide container stream that is converted into a plurality of single-track container streams 4.1 to 4.6. Within these container streams, the containers 3 have an arbitrary orientation relative, for example, to their container features and/or their furnishing features.

Through the separating and bringing together of a predetermined number of containers 3, i.e. for example three containers 3, compressed or formed container groups 5.1 and 5.2 or part-packs 5.1 and 5.2 are formed and subsequently combined to form a pack 2. At least one of the containers 3 of the pack 2, and preferably each container 3 of the pack 2, has a bonding or adhesive agent on at least one contact surface or interface. The contact surfaces and interfaces are clearly shown in the figures by the contact of containers 3 against one another. However, these contact surfaces and interfaces are not provided with a reference number.

FIG. 1 shows a linear transporter 6 that transports containers 3 from an inlet side 7 towards an outlet side 8. An arrow 9 indicates the transport direction from the inlet side 7 to the outlet side. The packaging machine 1 has a center-line X and three sections 10, 11 and 12. The first section 10 begins at the entry end and merges into the second section 11. The second section 11 adjoins the third section 12.

Applicator elements 13, 14 in the first section 10 and in a second section 11 of the linear transporter 6 apply bonding or adhesive agent to the containers. Transversely displaceable head guides 15 are provided in the first section 10 of the linear transporter. The second section 11 receives part-packs 5.1, 5.2 from the first section 10, turns them, and feeds them downstream to the third section 12. The second section 11 is thus implemented as a turning-and-feeding section for the part-packs 5.1, 5.2. The third section combines the part-packs 5.1, 5.2 to form the complete pack 2 and conveys the complete pack 2 towards the discharge side 8.

It is beneficial if the first section 10 of the linear transporter 6 has a plurality of transport surfaces 16.1-16.6, each of which conveys containers 3 in corresponding single tracks 4.1-4.6 from the inlet side 7 towards the outlet side 8 and towards the second section 11 of linear transporter 6. In the illustrated embodiment, there are six such transport surfaces 16.1-16.6.

The first section 10 of the linear transporter 6 has three part-regions 10.1, 10.2, 10.3. The first part-region 10.1 extends from the inlet side 7 towards the second part-region 10.2. The second part-region 10.2 connects to third part-region 10.3. The third part region 10.3 extends to the second section 11 of the linear transporter 6.

Within first part-region 10.1, the exemplary six transport surfaces 16.1-16.6 are parallel with one another. The second part-region 10.2 brings the single-track container streams 4.1-4.6 together by bringing together their respective transport surfaces 16.1-16.6 to form the respective part-packs 5.1, 5.2.

In third part-region 10.3, the respective part-packs 5.1, 5.2 are transported towards the second section 11.

In the illustrated example, the second part-region 10.2 forms two part-packs 5.1, 5.2, each of which has three containers 3. As shown by way of example, the six single-track container streams 4.1-4.6 are brought together such that a first group of three single-track container streams 16.1-16.3 makes the first part-pack 5.1 and a second group of three container streams 16.4-16.6 makes the second part-pack 5.2.

In the second part-region 10.2, the central transport surfaces 16.2, 16.5 of each of the two sets of three transport surfaces 16.1-16.3, 16.4-16.6 are parallel to one another and to a center-line X of the linear transporter 6. The outer transport surfaces 16.1, 16.6 are guided from the outside towards center-line X of the linear transporter 6. The inner transport surfaces 16.3, 16.4 are guided away from the center-line X of the linear transporter 6. The two part-packs 5.1, 5.2, which each have three containers 3, are formed in this way.

When seen in plan view, the second part-region 10.2 defines a cone or frustum with its three container tracks 4.1-4.3 and 4.4-4.6, defined by the transport surfaces 16.1-16.3, 16.4-16.6. The cone or frustum tapers as one proceeds through the second part-region 10.2 between the first part-region 10.1 and the third part-region 10.3.

The applicator elements 13 that are arranged in the second part-region 10.2 of the first section 10 of the linear transporter 6 only provide containers 3 of the central container track 4.2, 4.5 (16.2, 16.5) with bonding or adhesive agent. It is sufficient for the purpose of the invention for just one container 3 of the part-pack 5.1, 5.2, preferably the central container, to be provided with the bonding or adhesive agent on its contact surfaces and interfaces.

In third partial region 10.3 the two groups of three containers 3, which are now called part-packs 5.1, 5.2, stand three abreast relative as they are conveyed towards the second section 11 side-by-side and aligned square to transport direction 9.

If a UV-curing adhesive is applied, a curing station or curing section can be provided in the first section 10, preferably in its third part-region 10.3.

Figure 2:
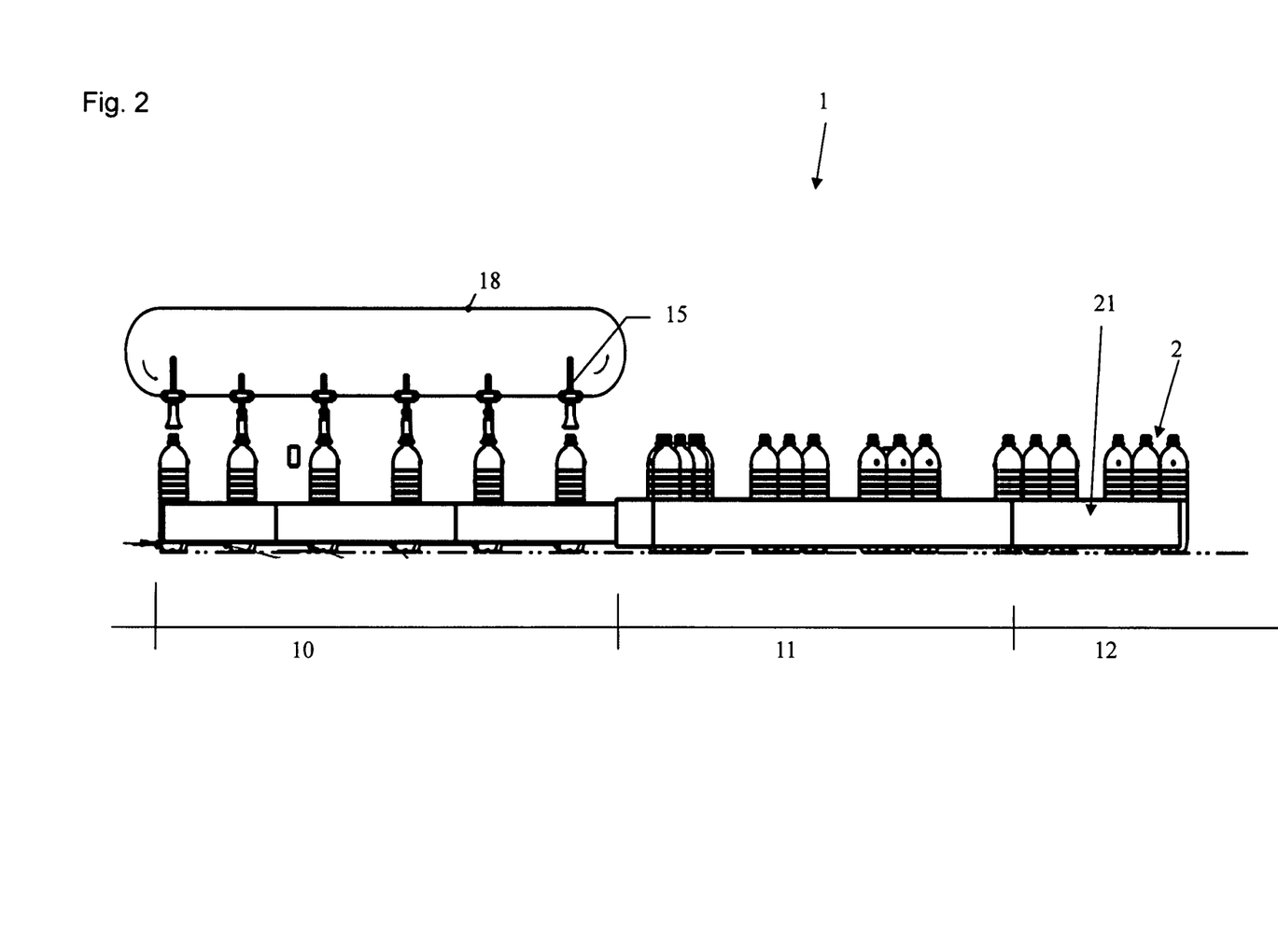
FIG. 2 shows in side view the partial section of FIG. 1.

As can be seen from FIG. 1, head guides 15 are disposed on the first section 10 of the linear transporter 6. These head guides 15 can be implemented as tulips, as shown in FIG. 2. Such tulips are commonly found in labeling machines.

The number of head guides 15 in a transverse row is the same as the number of single-track container streams 4.1-4.6. In the illustrated example, there are six head guides 15. The head guides 15 are mounted on cross-rails 17, with the corresponding number of head guides 15 being disposed on each cross-rail 17. A plurality of cross-rails 17 is provided. Cross-rails 17 extend continuously across the streams 4.1-4.6 and attached to a drive element 18, which can be implemented as a chain or as a belt, as shown schematically in FIG. 2.

The head guides 15 engage over the container head from above to stabilize the container's position as it is transported in the transport direction 9. The head guides 15 are moved down to engage the containers 3 at the inlet end and lifted off from the containers 3 at the end of first section 10, as shown in FIG. 2.

As shown in FIG. 1, the containers in the inner and outer container streams move transversely as they are conveyed in the transport direction. In order to be able to move with the containers, the head guides 15 can also be displaced transversely. This is advisable since in the second part-region 10.2 the containers in the inner container streams 4.3, 4.4 and in the outer container streams 4.1, 4.6 will have to move transversely. This enables the head guides 15 to continue to stabilize the containers even as the containers 3 run at an angle towards respective central transport surfaces 16.2, 16.5.

The head guides 15 also exert sufficient force on bundled containers 3 to promote formation of an adhesive bond. As shown in FIG. 1, the head guides can be displaced relative to the cross-rails 17. The head guides 15 have an appropriate drive for causing this displacement.

Respective outer and inner head guides 15 with containers 3 guided thereon are guided towards one another, with part-packs 5.1 and 5.2 or their containers 3 being pressed against one another under the application of a force along their transport path. The drive for driving the head guides 15 can be implemented as a sliding block guide with a head guide 15 engaging in the corresponding guide by a control element. A further possibility is a motorized drive, preferably using an electric motor.

In the second section 11, which follows the first section 10 of the linear transporter 6, the part-packs 5.1 and 5.2 are preferably rotated by 90° out of their initial alignment square to transport direction 9 so that the part-packs 5.1 and 5.2 are aligned parallel with transport direction 9 with one container following the other along the transport direction 9. As a result, by the end of the second section 11, the containers are no longer three abreast. They are in single file.

This aligning effect can be assisted if the second section 11 is continuously tapered so that a transport width decreases in the transport direction. Thus, the lanes for part-packs 5.1, 5.2 in an end region 18 of the second section 11 have a transport width that is just slightly greater than the diameter of container 3, with only one transport lane 19.1, 19.2 being provided in end region 18 for respective part-pack 5.1, 5.2.

In its end region 18, therefore the second section 11 is configured with only one transport lane 19.1, 19.2 per part-pack 5.1, 5.2. These lanes 19.1, 19.2 guide the two part-packs 5.1, 5.2 towards one another at an angle to the transport direction. Further applicator elements 14 in the end region 18 apply bonding or adhesive agent to the contact surfaces or interfaces of containers 3 arranged in the part-packs 5.1, 5.2 so that the two part-packs 5.1, 5.2 can adhere together to form the completed container pack 2.

A further beneficial measure is for the transport width of respective transport lanes 19 to be slightly greater than the diameter of containers 3. This avoids the possibility of adhesive that is on the sticky side of a container from rubbing along the containing walls and impairing the bonding or adhesive agent application.

The two partial packs 5.1 and 5.2 are brought together at the exit of second section 11 and the entry of third section 12 to form the complete pack 2, with the contact surfaces and interfaces provided with bonding of adhesive agent lying against one another.

The third section 12 has two transport surfaces 20.1, 20.2, i.e. one transport surface 20.1, 20.2 for each original part-packs 5.1, 5.2. Lateral guide elements 21 are arranged on the transport surfaces 20.1, 20.2. The guide elements 21 are at right angles to the transport direction 9 and at a distance from the center-line X to press the container 3 in the complete pack 2 against one another. This force further promotes adhesive bonding.

In the illustrated embodiment, the guide elements 21 are implemented as guide rails that guide or support packs 2 or containers 3 of a pack 2 between them. In some embodiments, the guide elements 21 are rigid. However, this does not preclude embodiments in which the guide elements 21 are configured as travelling elements such that containers 3 and/or packs 2 do not have speed relative to the laterally disposed guide elements 21. A lateral pressure that promotes adhesive bonding of containers 3 of the pack 2 can be generated with laterally disposed guide elements 21. In other words, the guide elements 21 not only have the function of guiding and supporting but also the function of generating a pressure acting on containers 3. This pressure, when looked at square to transport direction 9, compresses containers 3 of pack 2 and/or draws them nearer to one another, pressing them against one another so as to promote an adequate adhesive bond.

As can be seen in FIGS. 1 and 2, the guide elements 21, which have at times been referred to as a wall, are also provided in first and second sections 10 and 11. The guide elements 21 can be adjustable to allow containers 3 of different diameters to be combined with the device to form a pack 2. Some embodiments permit continuous adaptation for adjusting the clear width between laterally arranged guide elements 21.

If UV-curing adhesive is applied, a curing station or curing section can be arranged in the third section 12. Driver elements, such as those in first section 10, could also be provided at the third section 12 to assist the transport of complete packs 2 towards the discharge end 8.

The pack 2, i.e. the complete pack, which is made up of the part-packs, can be executed in a plurality of rows when seen in the transport direction, i.e. as depicted for example in two or three rows.

It is possible also to provide the complete pack 2 with a carrying element, such as a handle. Suitable devices may be provided downstream of the discharge end 1 or at a suitable position on linear transporter 6 to add a carrying element. The carrying element can also be attached to pack 2 with the adhesive agent.

The applicator elements 13 and 14 can be implemented as an applicator head or as a spray head for applying the adhesive agent, which is preferably low-viscosity liquid adhesive agent, and even more preferably, a UV-curing adhesive. As can be seen in FIG. 1, only the middle container 3 of a part-pack 5.1, 5.2 is provided with adhesive agent by applicator elements 13 disposed on both sides of middle container 3. The applicator elements 14 in the second section 11 are arranged near the downstream vertex of an end triangle formed by the transport lanes 19.1, 19.2.

In the depicted embodiment, the applicator elements 13, 14 are disposed rigidly. They are immovable on packaging machine 1. In a further embodiment, the applicator elements 13, 14 travel with the pack 2 or part-pack in common or singly at least along a partial section, after which they are returned to their respective initial positions so that they can repeat the application of adhesive to a new containers 3 for forming a new pack 2.

In a preferred embodiment the entraining elements can be configured as a bar, preferably as a round bar, i.e. as an entraining bar. The driver elements may also be themselves driven and/or be in connection with guide elements 21. If the driver elements are driven, they may glide or roll along on guide elements 21 with gliding or rolling means. The driven elements may be interconnected by way of pulling means, such as a rope, a chain, a toothed belt, or a similar structure, such as any structure from the class of structures that includes a rope, a chain, and a toothed belt as members thereof, so as to form continuous driver elements. This also applies to the drivers in first section 10.

Having described the invention, and a preferred embodiment thereof, what we claim as a new and secured by letters patent is:

1. An apparatus for producing container packs from single-track container streams, said apparatus comprising a compartment and/or compressor unit, applicator elements, a linear transporter for transporting along a transport direction, and displaceable head guides, wherein said compartment and/or compressor unit compartmentalizes and compresses a predetermined number of containers that are to be combined into packs, wherein said applicator elements are configured to apply a substance to a location on a container, wherein said substance is selected from the group consisting of a bonding agent and an adhesive agent, wherein said location is selected from the group consisting of a contact surface and an interface on a container of said pack, wherein said linear transporter comprises a first section, a second section, and a third section, wherein said first section of said linear transporter comprises a first part region, a second part region, and a third part region, wherein, in said first part region of said first section of said linear transporter, transport surfaces are parallel to one another, wherein in said second part region of said first section of said linear transporter, said transport surfaces are brought together to form respective part-packs, wherein in said third part region of said first section of said linear transporter, said part packs are oriented transversely to said transport direction and transported in a direction of said second section of said linear transporter in whose first and second section said applicator elements for applying bonding or adhesive agent are provided, wherein said displaceable head guides are provided for single-container transport in said first section of said linear transporter wherein said second section of said linear transporter comprises a turning-and-feeding section for said part-packs, and wherein, in said third section of said linear transporter, said part packs are brought together oriented in said transport direction to produce a complete pack, and transported towards a discharge side.

2. The apparatus of claim 1, wherein said applicator elements are arranged in a second part-region of said first section of said linear transporter, and wherein said applicator elements are arranged in an end region of said second section of said linear transporter.

3. The apparatus of claim 1, further comprising cross-rails, wherein said cross-rails that are attached to a drive element, wherein said cross rails circulate, and wherein said head guides are mounted on said cross-rails.

4. The apparatus of claim 1, wherein said head guides press containers of a respective part-pack against one another in said third part region of said first section of said linear transporter, and wherein said contact surfaces or interfaces are provided with substance selected from the group consisting of a bonding agent and an adhesive agent upstream in said second part-region of said first section of said linear transporter.

5. The apparatus of claim 1, wherein said part-packs are aligned parallel with said transport direction in said second section of said linear transporter.

6. The apparatus of claim 1, wherein a transport width of transport lanes of said second section of said linear transporter is reduced starting from said first section of said linear transporter going towards said third section of said linear transporter, with a clear minimum transport width thereof being greater than a diameter of said containers.

7. The apparatus of claim 1, wherein said applicator elements are disposed in an end region of said second section of said linear transporter.

8. The apparatus of claim 1, wherein said third section of said linear transporter comprises two transport surfaces.

9. The apparatus of claim 1, wherein said third section of said linear transporter comprises laterally disposed guide elements, wherein said laterally disposed guide elements apply a force square to said transport direction to said pack brought together from said part-packs.

* * * * *